(12) United States Patent
Hu et al.

(10) Patent No.: US 9,210,754 B2
(45) Date of Patent: Dec. 8, 2015

(54) LIGHT DEVICES

(75) Inventors: Hung-Lieh Hu, Hsinchu (TW);
Chen-Peng Hsu, Hsinchu (TW);
Hsin-Yun Tsai, Baoshan Township,
Hsinchu County (TW); Shih-Yi Wen,
Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 512 days.

(21) Appl. No.: 13/411,242

(22) Filed: Mar. 2, 2012

(65) Prior Publication Data
US 2013/0169167 A1 Jul. 4, 2013

Related U.S. Application Data

(60) Provisional application No. 61/557,352, filed on Nov. 8, 2011.

(30) Foreign Application Priority Data

Dec. 26, 2011 (TW) .............................. 100148543 A

(51) Int. Cl.
*H05B 37/02* (2006.01)
*H05B 33/08* (2006.01)

(52) U.S. Cl.
CPC ........ *H05B 33/0827* (2013.01); *H05B 33/0803* (2013.01)

(58) Field of Classification Search
USPC .................. 315/152–159, 149–150, 178–183,
315/185 R–186, 189, 193, 291, 294, 297,
315/307, 308, 312, 313, 317–320
See application file for complete search history.

(56) References Cited

U.S. PATENT DOCUMENTS

| | | | | |
|---|---|---|---|---|
| 4,963,798 | A * | 10/1990 | McDermott | .................. 315/312 |
| 5,003,357 | A | 3/1991 | Kim et al. | |
| 6,412,971 | B1 | 7/2002 | Wojnarowski et al. | |
| 6,623,151 | B2 * | 9/2003 | Pederson | ...................... 362/542 |
| 6,657,393 | B2 * | 12/2003 | Natsume | ......................... 315/82 |

(Continued)

FOREIGN PATENT DOCUMENTS

| | | |
|---|---|---|
| TW | 200816870 A | 4/2008 |
| TW | I320838 | 2/2010 |
| TW | 201017292 | 5/2010 |

OTHER PUBLICATIONS

K.I. Hwu and W.C. Tu, "LED dimming ith efficiency considered," Electronics Letters 31$^{st}$ Mar. 2011 vol. 47 No. 7.

(Continued)

*Primary Examiner* — Douglas W Owens
*Assistant Examiner* — James H Cho
(74) *Attorney, Agent, or Firm* — Muncy, Geissler, Olds & Lowe, P.C.

(57) ABSTRACT

An light device, includes a plurality of first light cells arranged axisymmetrically about an axis; a plurality of second light cells arranged axisymmetrically around the axis; and a controller coupled to a brightness adjust unit, and determines whether to activate the first light cells and second light cells according to a brightness adjust value of the brightness adjust unit, wherein the average distance between the first light cells and the axis is shorter than the average distance between the second light cells and the axis.

16 Claims, 5 Drawing Sheets

(56) References Cited

U.S. PATENT DOCUMENTS

| | | | |
|---|---|---|---|
| 6,692,138 B2* | 2/2004 | Chornenky | 362/249.13 |
| 7,239,093 B2 | 7/2007 | Hsieh | |
| 7,321,203 B2 | 1/2008 | Marosek | |
| 7,518,158 B2 | 4/2009 | Keller et al. | |
| 7,592,496 B2 | 9/2009 | Vora et al. | |
| 7,638,808 B2 | 12/2009 | Owen et al. | |
| 7,642,734 B2 | 1/2010 | De Anna | |
| 7,788,833 B2* | 9/2010 | Hauck et al. | 40/442 |
| 7,902,761 B2 | 3/2011 | Ang et al. | |
| 7,936,135 B2 | 5/2011 | Hum et al. | |
| 2002/0075681 A1 | 6/2002 | Chornenky | |
| 2011/0032712 A1 | 2/2011 | Dias et al. | |

OTHER PUBLICATIONS

Kuo, C.-L., Liang T.-J., Chen, K.H., Chen, J.-F., "Design and Implementation of High Frequency AC-LED Driver ith Digital Dimming," Advanced Power Electronics Center, Department of Electrical Engineering, National Cheng kung Iniversity, Tainan, Taiwan p. 3713, 2010.

Xu X., Wu X., "High Dimming Ratio LED Driver ith Fast Transient Boost Converter," Institute of VLSI, Zhejiang University Hangzhou, China 310027 p. 4192, 2008.

Dong Z., Wang ., Huang B., Zhang Xu., Guan N., Chen J., Gui J., Liu H., Chen H., "Silicon-based LED Display Array in Standard CMOS Technology," State Key Lab on Integrated Optoelectronics, Institute of Semiconductors, CAS Institute of Semiconductors, CAS, ISCAS Beijing, China p. 332, 2010.

Jeung, W. K., Shin S.H., Choi, S.M., Yi, S., Yoon, Y.B., Kim, H. J., Lee, S. J., Park, K. Y., "Silicon-Based, Multi-Chip LED Package," Electronic Components and Technology Conference 2007 p. 722.

Official Action issued on Dec. 24, 2013, by the Tawainese Patent Office in corresponding Tawainese Patent Application No. 100148543.

* cited by examiner

LIGHT DEVICES

CROSS REFERENCE TO RELATED APPLICATIONS

This application claims priority of Taiwan Patent Application No. 100148543, filed on Dec. 26, 2011, the entirety of which is incorporated by reference herein.

TECHNICAL FIELD

The technical field relates to a light device, and more particularly relates a brightness adjustable LED light devices.

BACKGROUND

High-powered light-emitting diode (LED) chip technology continues to progress, and LED light sources have been quickly and widely used for various lighting purposes. However, in different lighting purposes, the quality requirements for the light source are not the same. Concerning technological developments of the LED, although efforts have been put into improving brightness, luminous efficiency, color rendering property and color temperature consistency, few have noticed the problem of brightness modulation of the LED. Nowadays LED brightness modulation is achieved by pulse width modulation (PWM). Compared to traditional analog current modulation, the pulse width modulation control method has the advantage to overcome variations of the LED color temperature and wavelength caused by variations of the current, and digital control of the PWM is easier.

However, the LED light source generated by pulse width modulation has a flicking problem during the modulation (100 Hz to 1 KHz). When the LED light source is captured by charge-coupled devices (CCDs) or complementary MOSFET (CMOS) image sensors (cross scanning in vertical: 60 Hz, horizontal: 15750 Hz), it is easy to observe that the on-off pattern of the pulse width modulation produces light and dark ripples shown on the display corresponding to the CCD or CMOS image sensor, so the pulse width modulation can not meet the requirements of the scanning frequency. Thus, the image quality on the display is seriously affected.

SUMMARY

An embodiment of a light device, comprising: a plurality of first light cells, arranged axisymmetrically about an axis; a plurality of second light cells, arranged axisymmetrically about the axis; and a controller, determining whether to activate the first light cells and second light cells according to a brightness adjust value, wherein an average distance between the first light cells and the axis is shorter than an average distance between the second light cells and the axis.

DESCRIPTION OF EMBODIMENTS

The making and using of the embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the disclosure, and do not limit the scope of the disclosure.

Figure 1:
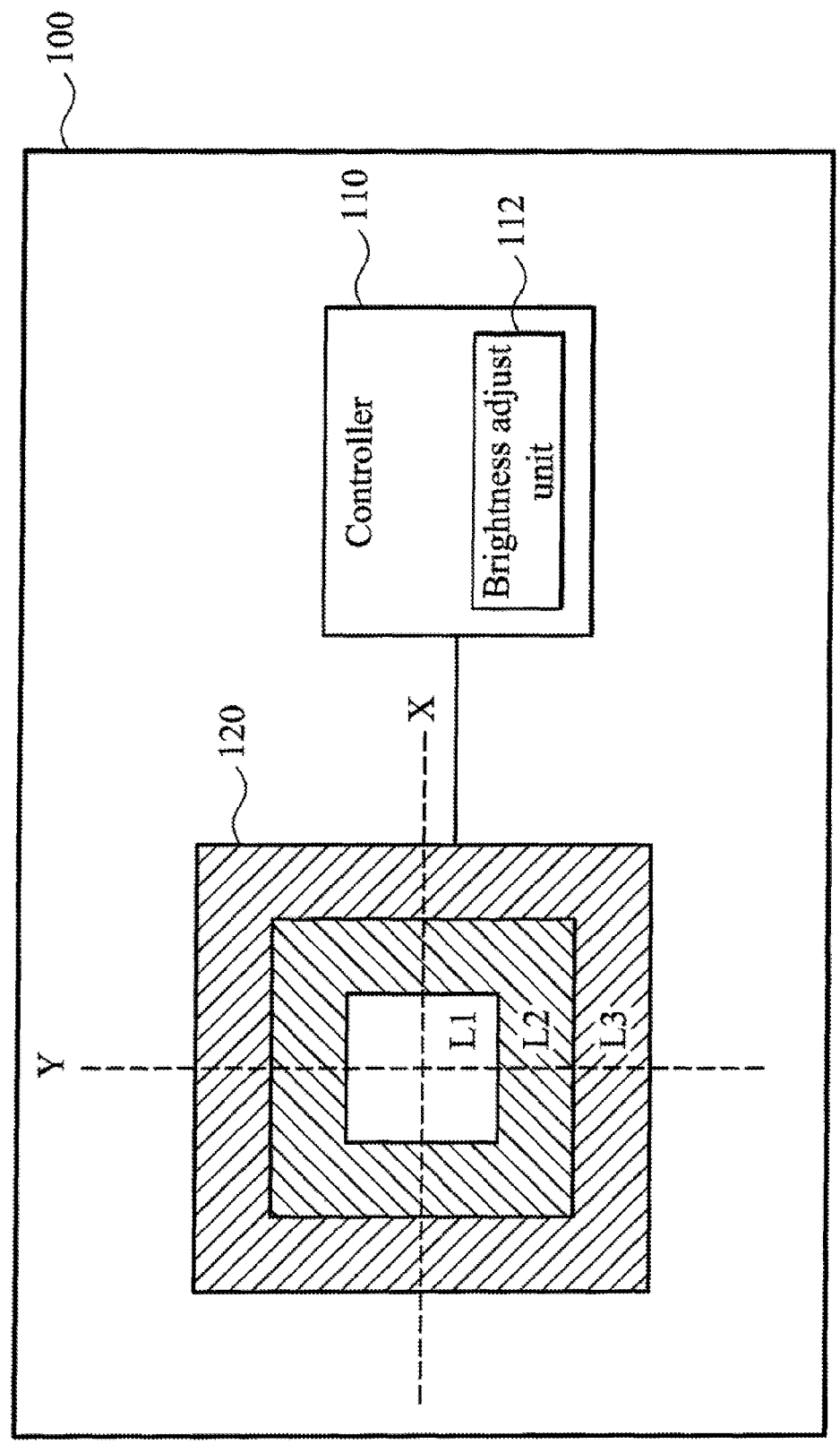
FIG. 1 is a schematic diagram illustrating an embodiment of a light device.

FIG. 1 is a schematic diagram illustrating an embodiment of a light device 100. The light device 100 comprises a controller 110 and a light module 120. The light module 120 comprises light areas L1, L2 and L3, and each of the light areas L1, L2 and L3 is arranged axisymmetrically about the X-axis or Y-axis. The controller 110 may selectively activate different light areas for adjusting the brightness of the light module 120. For example, the light module 120 may generate the maximum brightness when the controller 110 activates the light areas L1, L2 and L3, the light module 120 may generate the second maximum brightness when the controller 110 activates the light areas L1 and L2, similarly, and the light module 120 may generate the minimum brightness when the controller 110 activates the light area L1. Thus, the controller 110 can perform brightness adjusting. In another embodiment, the controller 110 may further comprise a brightness adjust unit 112, wherein the brightness adjust unit 112 may be any component which can indicate a value, such as a control pad, a variable resistor, and a digital value adjustment unit. Also, the controller 110 may selectively activate different light areas according to the value indicated by the brightness adjust unit 112. Thus, the controller 110 can perform brightness adjusting via the brightness adjust unit 112. Note that the relation between the brightness of the light module 120 and the value of the brightness adjust unit 112 is not limited thereto, but based on design of a user, for example, the threshold of the value indicated by the brightness adjust unit 112 can be set, or the smallest value of brightness adjust unit 112 can indicate the maximum brightness of the light module 120.

Figure 2A:
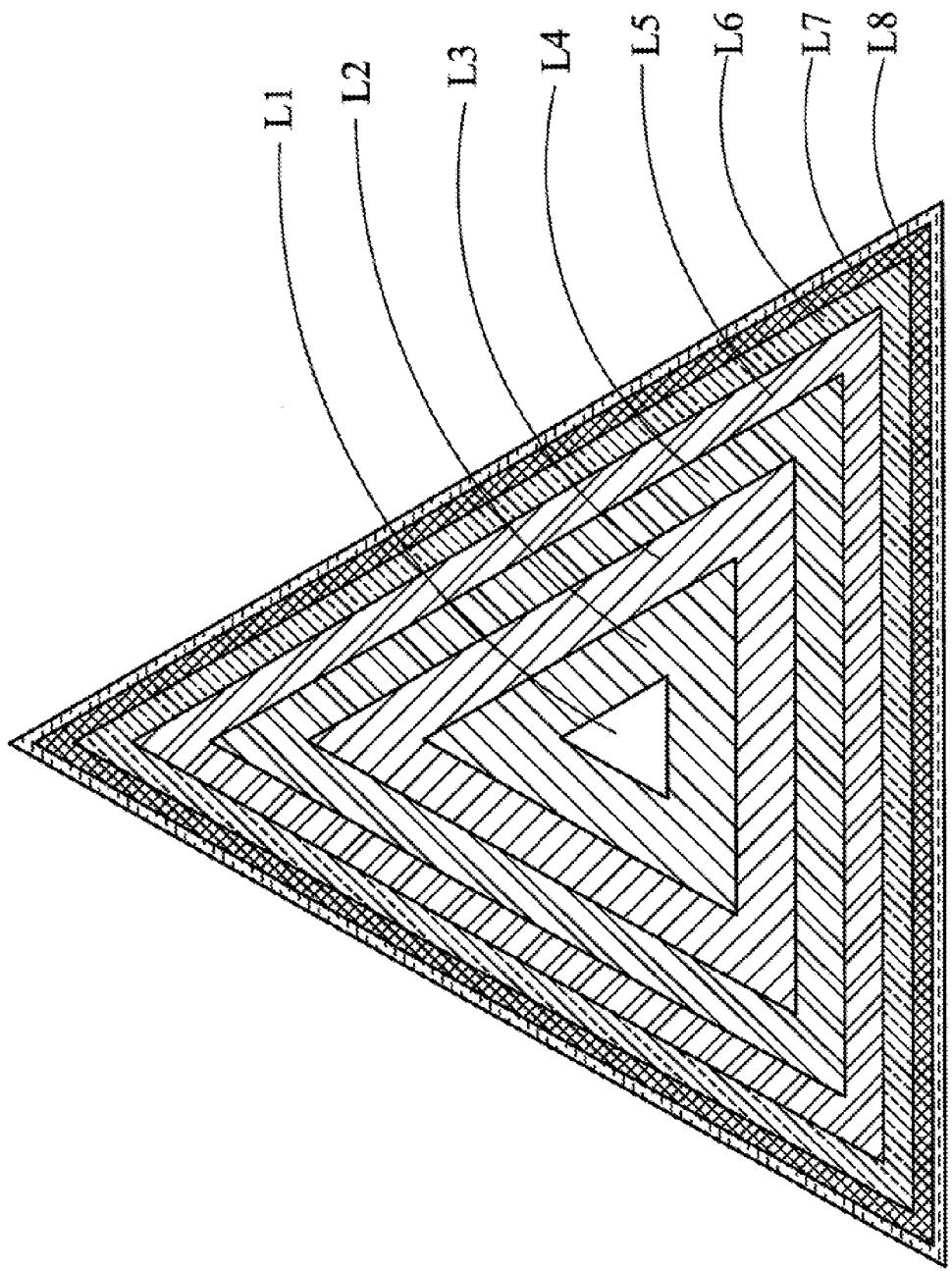
FIG. 2A is a schematic diagram illustrating an embodiment of light areas arranged as a triangle and triangular rings.
Figure 2B:
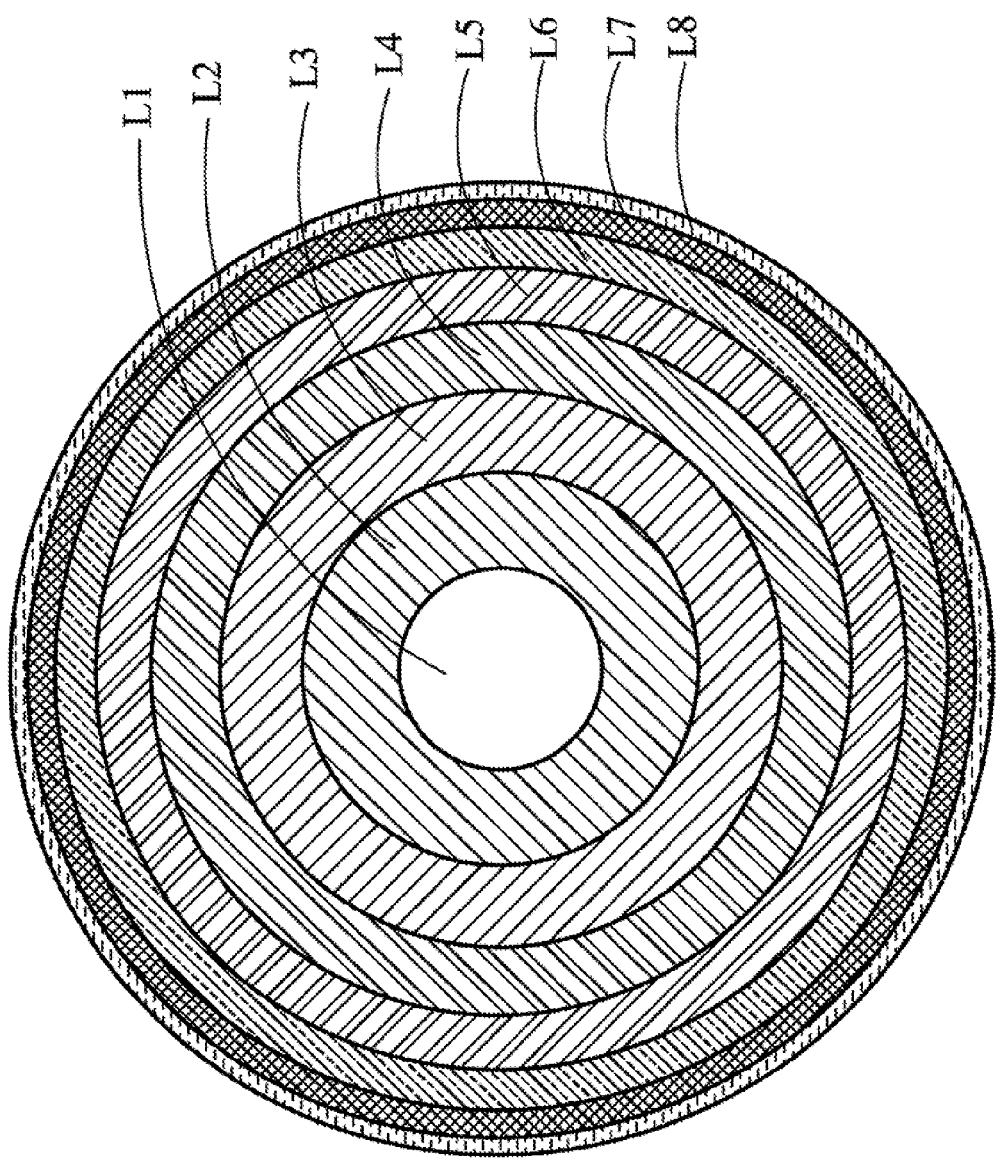
FIG. 2B is a schematic diagram illustrating an embodiment of light areas arranged as a circle and circular rings.
Figure 2C:
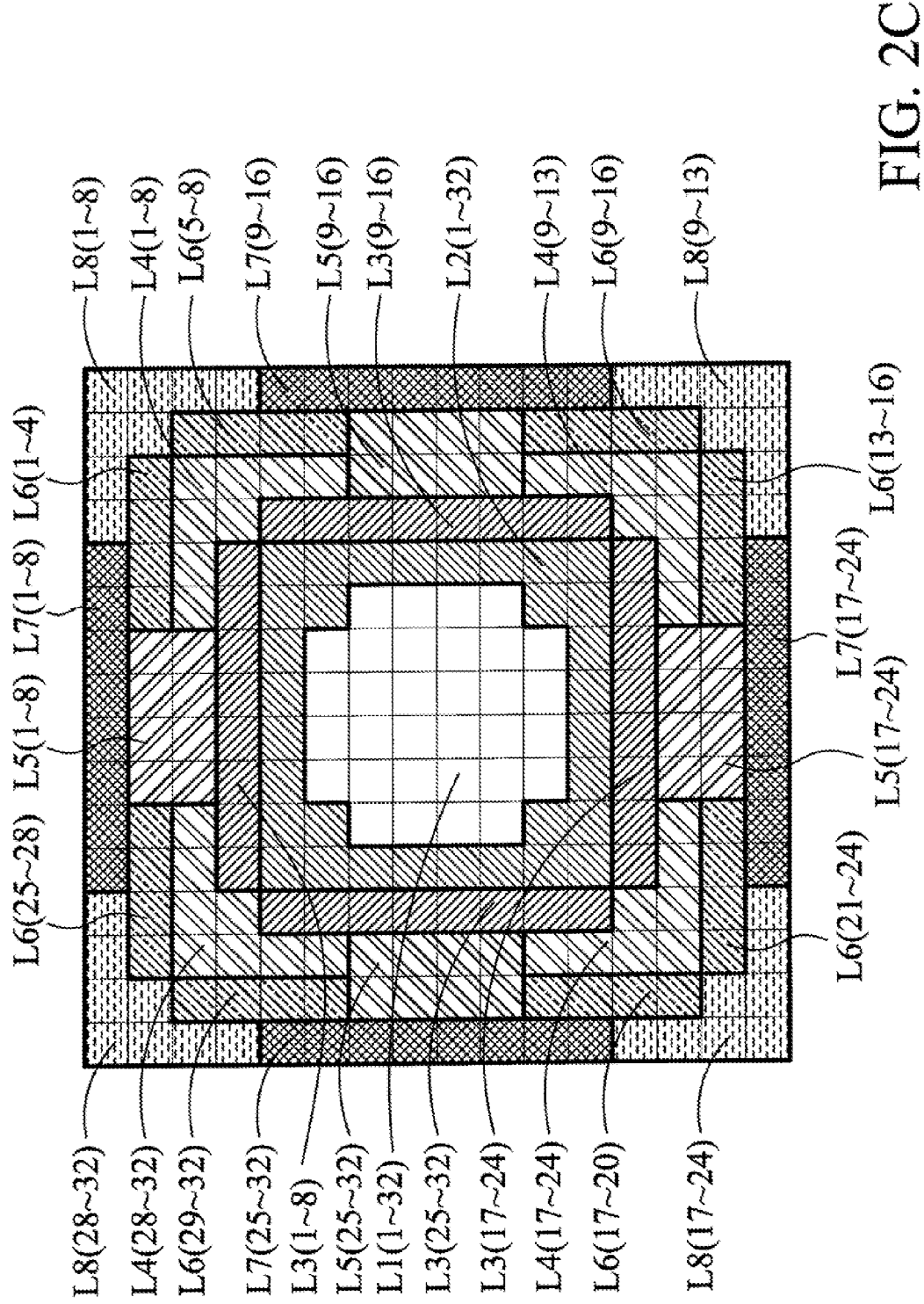
FIG. 2C is a schematic diagram illustrating an embodiment of light areas arranged discretely.

Refer to the embodiment of FIG. 1, wherein each of the light area is not only arranged axisymmetrically about the X-axis or Y-axis, but also arranged axisymmetrically about both the X-axis and Y-axis. In other words, each of the light area is arranged in point symmetry around the intersection point of the X-axis and Y-axis. In the embodiment, the light area may be arranged axisymmetrically about only one axis according to requirements. Although the light areas are arranged as a rectangle and rectangular rings as shown in FIG. 1, the light areas still can be arranged as different shapes, and the amount of the light areas can be different according to design. For example, the light module has light areas L1~L8 arranged as a triangle and triangular rings as shown in FIG. 2A, the light module has light areas L1~L8 arranged as a circle and circular rings as shown in FIG. 2B, and the light module has light areas L1~L8 arranged axisymmetrically and discretely as shown in FIG. 2C. In the embodiment of FIG. 2C, each of the light areas has the same amount of light cells (32).

In the embodiments, a different brightness adjusting scheme with more brightness levels can be achieved based on the arrangement of the light areas L1~L3. Since each of the light area is arranged axisymmetrically, and the light areas are activated in order from the inside to the outside and are deactivated in order from the outside to the inside, stable and uniform light can be produced at each brightness levels, and the brightness may be adjusted to prevent high frequency flicking which occurs when the PWM is used for brightness adjustment. For the PWM that is currently used for adjusting brightness, when the image sensor CCD or CMOS has a scan frequency higher than that of the PWM, the image captured by the image sensor has dark ripples, which causes the image on the display to also have dark ripples, and adversely affects quality of the displayed image on the display. However the effect can be avoided in the embodiment. In addition, the LED cells of the light area can be manufactured by the Thin Film LED Packages (TFP) process, such that the positioning accuracy of die bond is not limited, the gap between the light areas is reduced, and the non-uniform brightness or color of the light area is reduced. It should be noted, in another embodiment, the order of turning light areas on/off is not limited to tuning light areas on from the inside to outside or turning light areas off from the outside to inside, and can be designed according to the application or requirements.

In an embodiment, each of the light areas L1, L2 and L3 of the light module 120 is composed of a plurality of light cells, such as a light cell of a micro-LED array, or a LED cell. In an embodiment, the light cells of the light module 120 may be a multi-chip LED array, and the integrated multi-chip LED array can be produced by the technique of die bond-welding line or a manufacturing process method of AC/HV LED. The LED cell can be produced by the manufacturing process of an LED chip. For example, after the LED cells manufacturing process of the light area on a sapphire substrate having LED epitaxial layer is performed, the sapphire substrate is integrated with a packaged substrate. The integration can be in the form of a flip chip or similar thin-film LED which has only a single-sided electrode junction with the packaged substrate. After the integration is finished, the sapphire substrate is removed by using laser stripping technology (Laser Lift-Off). Thus, independently activated pins of each LED cells can be achieved by the wiring of the packaged substrate. In the case of a similar thin-film LED which has only a single-sided electrode junction with the packaged substrate, independently activated pins of each LED cells can be produced by the transparent electrode and the packaged substrate electrode manufacturing process.

In an embodiment, in order to achieve the uniformity of the brightness difference, each of the light areas L1, L2 and L3 has the same amount of light cells or has the same dimension of lighting area, as shown in FIG. 2C. Also, due to the light area L1 being arranged inside of the light area L2 and the light area L2 being arranged outside of the light area L1, the average distance between the light cells of the light area L1 and X-axis (or Y-axis) is shorter than the average distance between the light cells of the light area L2 and X-axis (or Y-axis).

Figure 3:
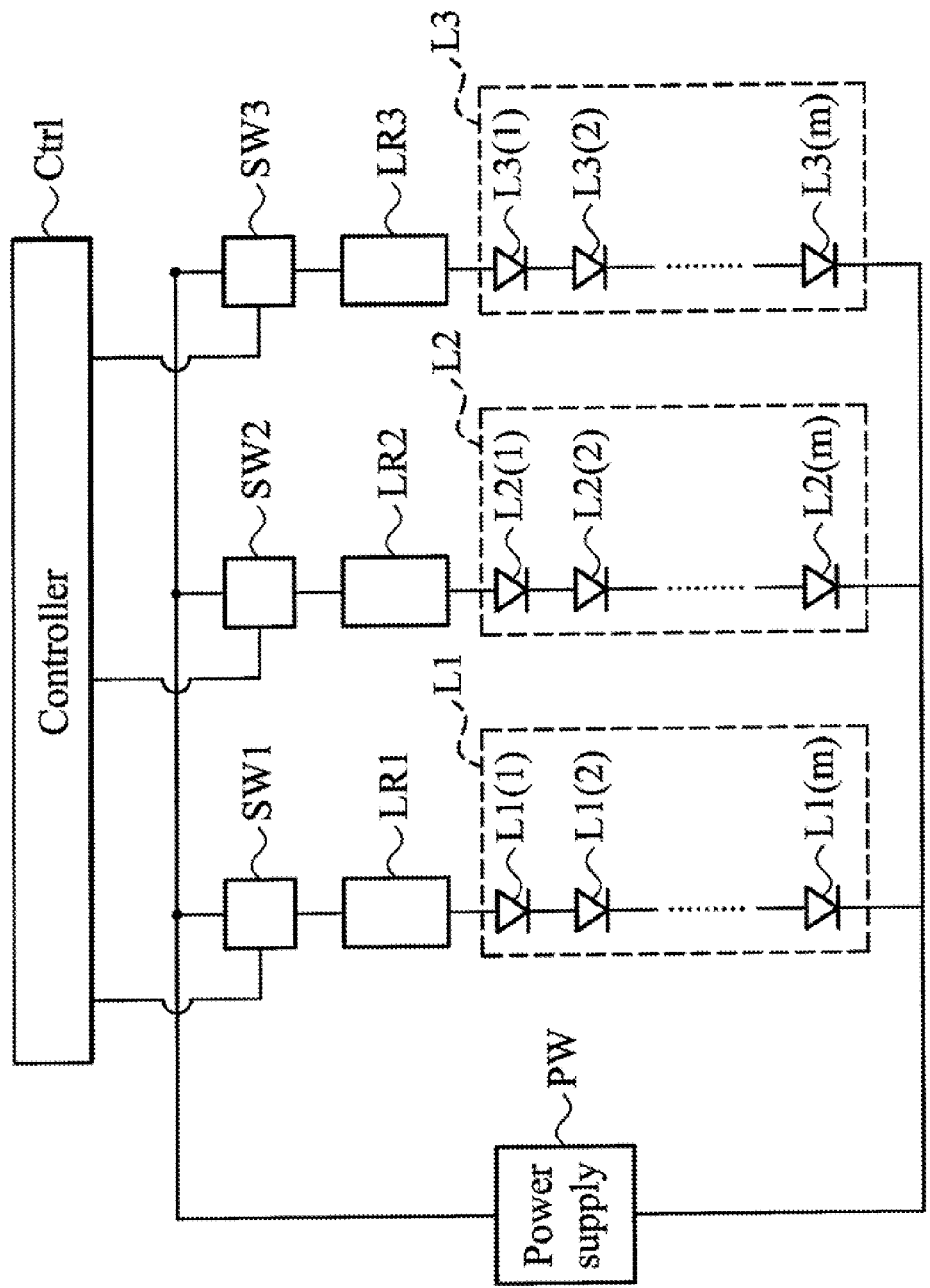
FIG. 3 is a block diagram illustrating an embodiment of a light device.

FIG. 3 is a block diagram illustrating an embodiment of a light device 300. The light device 300 comprises a power supply PW, a controller Ctrl, switches SW1, SW2 and SW3, linear regulators LR1, LR2 and LR3, light area L1 with light cells L1(1)~L1(m) connected in series, light area L2 with light cells L2(1)~L2(m) connected in series, and light area L3 with light cells L3(1)~L3(m) connected in series. Generally speaking, the light cell may be an LED. In an embodiment, the light cells connected in series may be designed according the grid voltage, such that the component with high surge current capability can shrink, and the integration and digitalization can be achieved. The power supply PW provides a driving voltage to the switch SW1, the linear regulator LR1, and the light cells L1(1)~L1(m). If the light cells L1(1)~L1(m) of light area L1 need to be turned on, the user can transmit an activate signal to the switch SW1 by the controller Ctrl. When the switch SW1 turns on, the linear regulator LR1 generates a fixed current to the light cells L1(1)~L1(m) according to the driving voltage provided from the power supply PW. Due to the linear regulator LR1 maintaining the driving of the fixed current within a large range of the working voltage, voltage error caused by the light cells with different driving voltages integrated in the silicon substrate can be overcome. On the other hand, if the light cells L1(1)~L1(m) of light area L1 need to be turned off, the user can transmit an inactivate signal to the switch SW1 by the controller Ctrl.

In addition, the switches SW2 and SW3, the linear regulators LR2 and LR3, the light area L2 with light cells L2(1)~L2(m) connected in series, and the light area L3 with the light cells L3(1)~L3(m) connected in series operate in same way as the switch SW1, the linear regulator LR1, and the light cells L1(1)~L1(m). By this, the controller Ctrl can control the on/off states of the light areas L1, L2 and L3 individually. As described in the embodiment of FIG. 1, the light areas are arranged axisymmetrically, and the light areas are activated in order from the inside to the outside and are deactivated in order from the outside to the inside. This allows stable and uniform light to be produced at each brightness level, and the brightness may be adjusted to prevent high frequency flicking which occurs when PWM is used for brightness adjustment.

In some embodiments, the switches SW1, SW2 and SW3 can be MOS-controlled thyristors. Thus, once the switch receives an enable signal (such as high voltage impulse signal), the switch keeps turning on, instead of being provided a continual enable signal, such that the power consumption is reduced. On the other hand, once the turn-on switch receives a disable signal, the switch turns off.

In addition, FIG. 3 merely discloses a simple embodiment of the circuit connection, wherein the light areas L1, L2 and L3 are still arranged axisymmetrically in this embodiment. Although the embodiment merely discloses three light areas, more light areas can be set and controlled. In an embodiment, the components shown in FIG. 3 can be integrated in a silicon substrate, and the silicon substrate further is integrated with a protection component. When one of the light cells fails, the protection component can change the current loop to bypass the failed light cell, such that the other light cells can still work.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A light device, comprising:
    a plurality of first light cells, arranged in axisymmetric around an axis;
    a plurality of second light cells, arranged in axisymmetric around the axis; and
    a controller, determining whether to activate the first light cells and second light cells according to a brightness adjust value;
    a power supply, providing a driving voltage;
    a first switch, connected between the first light cells and the power supply;
    a second switch, connected between the second light cells and the power supply,
    wherein the controller transmits a first activate signal to the first switch and a second activate signal to the second switch, the first switch and the second switch are driving signal latch units, and the first activate signal and the second activate signal are impulse signals;

wherein an average distance between the first light cells and the axis is shorter than an average distance between the second light cells and the axis, and wherein when the brightness adjust value is larger than a predetermined value, the controller activates the first light cells and second light cells, and when the brightness adjust value is smaller than the predetermined value, the controller activates the first light cells but does not activate the second light cells.

2. The light device of claim 1, wherein the controller is coupled to a brightness adjust unit, and the controller obtains the brightness adjust value based on a value indicated by the brightness adjust unit.

3. The light device of claim 1, wherein the amount of the first light cells is the same as the amount of the second light cells.

4. The light device of claim 1, wherein the area of the first light cells is the same as the area of the second light cells.

5. The light device of claim 1, wherein the controller transmits a first inactivate signal to the first switch, and the first switch turns off when the first switch receives the first inactivate signal, and the controller transmits a second inactivate signal to the second switch, and the second switch turns off when the second switch receives the second inactivate signal.

6. The light device of claim 5, wherein when the first switch receives the first activate signal, the first switch turns on until the first switch receives the first inactivate signal, and when the second switch receives the second activate signal, the second switch turns on until the second switch receives the second inactivate signal.

7. The light device of claim 1, further comprising:
a first linear regulator, coupled to the first light cells, providing a first fixed current to the first light cells according to the driving voltage; and
a second linear regulator, coupled to the second light cells, providing a second fixed current to the second light cells according to the driving voltage.

8. The light device of claim 1, wherein each of the first light cells is connected in series, and each of the second light cells is connected in series.

9. The light device of claim 1, wherein the axis has a symmetrical point, and the first light cells is further arranged in point symmetry around the symmetrical point, and the second light cells is further arranged in point symmetry around the symmetrical point, and an average distance between the first light cells and the symmetrical point is shorter than an average distance between the second light cells and the symmetrical point.

10. The light device of claim 1, wherein the first light cells form a circular lighting area, and the second light cells form a circular ring lighting area outside the circular lighting area.

11. The light device of claim 1, wherein the first light cells form a rectangular lighting area, and the second light cells form a lighting area outside the rectangular ring lighting area.

12. The light device of claim 1, wherein the first light cells form a triangular lighting area, and the second light cells form a lighting area outside the triangular ring lighting area.

13. The light device of claim 1, wherein the first light cells form a polygonal lighting area, and the second light cells form a lighting area outside the polygonal ring lighting area.

14. The light device of claim 1, wherein the first switch turns on when the first switch receives the first activate signal, and the second switch turns on when the second switch receives the second activate signal.

15. A light device, for generating a light, comprising:
a plurality of first light cells, arranged in axisymmetric around an axis;
a plurality of second light cells, arranged in axisymmetric around the axis; and
a controller, determining whether to activate the first light cells and second light cells according to a brightness adjust value;
a power supply, providing a driving voltage;
a first switch, connected between the first light cells and the power supply;
a second switch, connected between the second light cells and the power supply,
wherein the controller transmits a first activate signal to the first switch and a second activate signal to the second switch, the first switch and the second switch are driving signal latch units, and the first activate signal and the second activate signal are impulse signals;
wherein an average distance between the first light cells and the axis is shorter than an average distance between the second light cells and the axis,
wherein when the brightness adjust value is larger than a predetermined value, the controller activates the first light cells and second light cells for generating the light with a first brightness, and when the brightness adjust value is smaller than the predetermined value, the controller activates the first light cells but does not activate the second light cells for generating the light with a second brightness, and
where the first brightness is higher than a second brightness.

16. A light device, comprising:
a plurality of first light cells, arranged in axisymmetric around an axis;
a plurality of second light cells, arranged in axisymmetric around the axis;
a power supply, providing a driving voltage;
a first switch, connected between the first light cells and the power supply;
a second switch, connected between the second light cells and the power supply, wherein the first switch and the second switch are driving signal latch units; and
a controller, determining whether to activate the first light cells and second light cells according to a brightness adjust value,
wherein an average distance between the first light cells and the axis is shorter than an average distance between the second light cells and the axis.

* * * * *